United States Patent [19]
Delmore et al.

[11] Patent Number: 5,750,159
[45] Date of Patent: May 12, 1998

[54] DIE FOR EXTRUDING ONE OR MORE FLUID STREAMS

[75] Inventors: Michael D. Delmore, Moundsview, Minn.; Gary W. Maier, Warren Township, Wis.

[73] Assignee: Minnesota Mining & Manufacturing Company, St. Paul, Minn.

[21] Appl. No.: 672,014

[22] Filed: Jun. 24, 1996

[51] Int. Cl.[6] .................................. B29C 47/10
[52] U.S. Cl. ................. 425/190; 118/315; 264/176.1; 425/382 R; 425/463
[58] Field of Search ................ 425/192 R, 190, 425/382.4, 104, 105, 463, 467, 382 R; 264/176.1, 178 F; 118/315

[56] References Cited

U.S. PATENT DOCUMENTS

| | | |
|---|---|---|
| 3,344,474 | 10/1967 | Davis et al. |
| 4,015,926 | 4/1977 | Nehmey ............................ 425/464 |
| 4,185,951 | 1/1980 | Webermeier et al. ............ 425/133.5 |
| 4,217,322 | 8/1980 | Sugano et al. |
| 4,283,168 | 8/1981 | Miller et al. ..................... 425/465 |
| 4,502,479 | 3/1985 | Garwood et al. |
| 4,521,359 | 6/1985 | Tsien .................................. 264/104 |
| 4,526,528 | 7/1985 | Kline et al. ...................... 425/133.5 |
| 4,570,622 | 2/1986 | von Bonin et al. |
| 4,609,578 | 9/1986 | Reed ................................... 428/76 |
| 4,619,802 | 10/1986 | Cloeren |
| 4,667,661 | 5/1987 | Scholz et al. |
| 4,774,937 | 10/1988 | Scholz et al. |
| 4,828,779 | 5/1989 | Hiraki et al. |
| 4,883,421 | 11/1989 | Morgan ............................. 425/135 |
| 4,892,473 | 1/1990 | Elia et al. ......................... 425/197 |
| 4,944,666 | 7/1990 | Hilke et al. ...................... 425/131.1 |
| 5,059,371 | 10/1991 | Saheki et al. .................... 264/108 |
| 5,072,688 | 12/1991 | Chino et al. ..................... 118/411 |
| 5,234,330 | 8/1993 | Billow et al. .................... 425/190 |
| 5,264,036 | 11/1993 | Haas et al. ....................... 118/315 |
| 5,281,380 | 1/1994 | Umeda et al. .................... 264/108 |
| 5,286,182 | 2/1994 | Maeda et al. ..................... 425/463 |
| 5,393,470 | 2/1995 | Miller ............................... 264/1.29 |
| 5,419,696 | 5/1995 | Henson ............................. 425/382.4 |
| 5,516,273 | 5/1996 | Delmore et al. ................. 425/192 R |
| 5,536,517 | 7/1996 | Hannaford ....................... 425/382.4 |

FOREIGN PATENT DOCUMENTS

| | | |
|---|---|---|
| 0 707 938 A2 | 4/1996 | European Pat. Off. |
| 57-014018 | 1/1982 | Japan. |
| 57-100032 | 6/1982 | Japan. |
| 808296 | 3/1981 | U.S.S.R. ............................ 425/467 |

OTHER PUBLICATIONS

Patent Abstracts of Japan, vol. 004, No. 029 & JP 55 003985.
Derwent Abstract, Week 7941 & SU 642 202.

*Primary Examiner*—Jay H. Woo
*Assistant Examiner*—Joseph Leyson
*Attorney, Agent, or Firm*—James D. Christoff

[57] ABSTRACT

A die for use in extrusion or coating processes includes an insert that is releasably received in a chamber of a die housing, and the insert has one or more flow-controlling peripheral surfaces that extend in an arc about its central axis. In one embodiment of the invention, the insert has ribs that separate the chamber into distinct parts for passage of two or more different fluid streams. In another embodiment, the insert is movable in an arc about its central axis from a first position wherein fluid is discharged through an outlet passageway, and to a second position wherein the flow of fluid through the outlet passageway is interrupted.

10 Claims, 7 Drawing Sheets

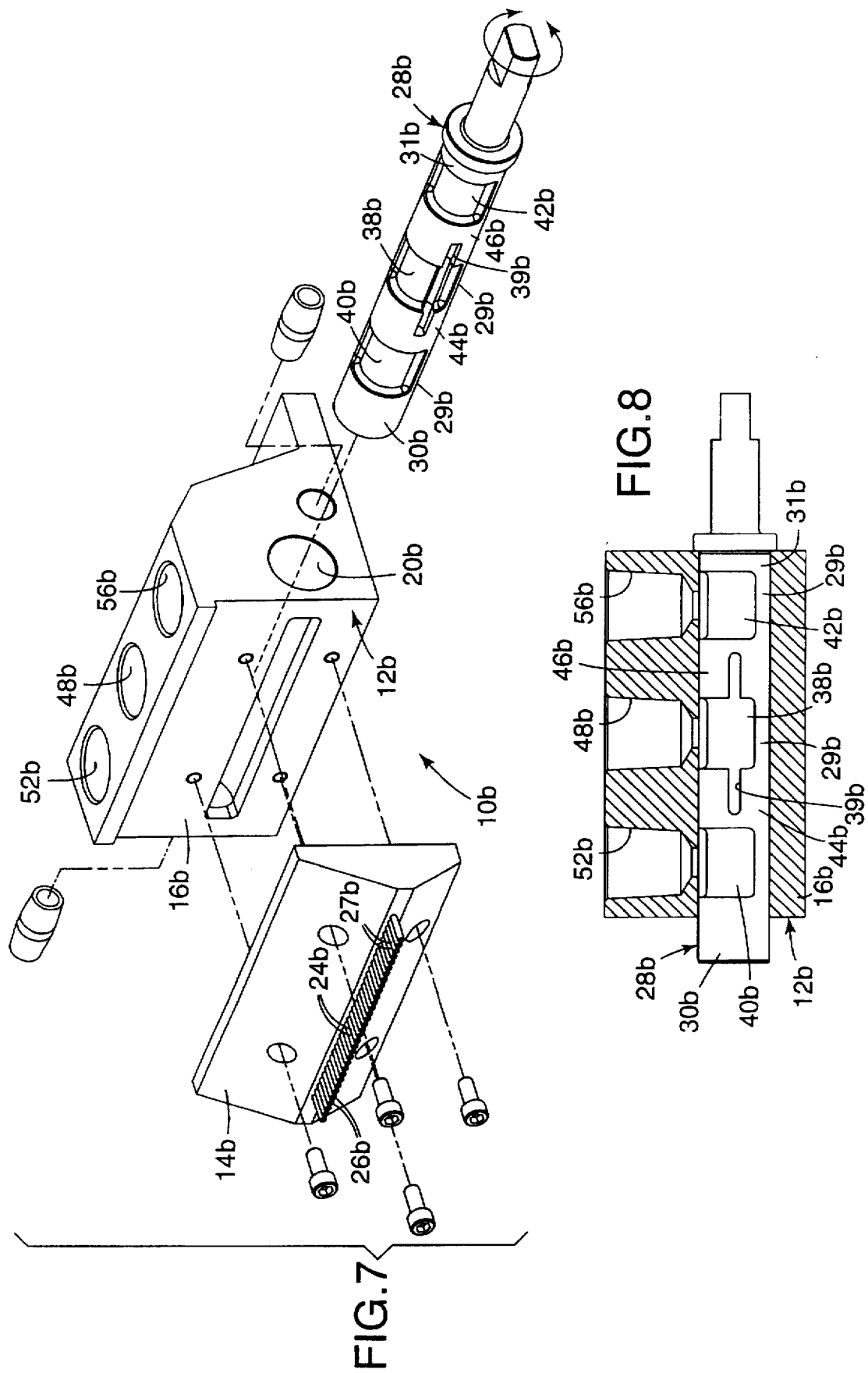

DIE FOR EXTRUDING ONE OR MORE FLUID STREAMS

BACKGROUND OF THE INVENTION

1. Field of the Invention

This invention relates in one aspect to an extrusion or coating die that is useful for simultaneously extruding two or more different fluid streams. The invention relates in another aspect to an extrusion or coating die for one or more fluid streams that has an internal fluid shut-off and diversion structure.

2. Description of the Related Art

Extrusion and coating dies are used in manufacturing processes to make a variety of goods. Some dies, for example, are used to form thin films, bars or other elongated shapes of plastic material. Other dies are used to apply a coating of fluid material to a moving web.

A number of different coating dies have been constructed to apply a liquid or semi-liquid material to a moving web. In general, such dies receive the liquid or semi-liquid material under pressure from a pump or other device, and distribute the material to regions across the width of the web as the web is advanced in directions along its longitudinal axis. Some dies include an outlet slot that discharges the fluid material in a ribbon pattern onto the web, while other dies include a series of closely-spaced discharge nozzles that are arranged to distribute the material to various regions across the width of the web.

Many conventional coating dies have an inlet passageway, an outlet passageway and an inner chamber that extends between the inlet passageway and the outlet passageway. The outlet passageway is relatively wide and often approximates the width of the web in instances where the die has a slot-type outlet for discharging a ribbon of fluid onto the web. The inner chamber is also relatively wide, and serves as a manifold to distribute incoming fluid from the inlet passageway to various regions of the outlet passageway.

One type of coating and extrusion die that has been widely used in the past has a triangular or "coat hanger" shape with a central inlet passageway, a relatively wide outlet passageway and an inner manifold chamber having a triangular shape to distribute the incoming fluid material to various regions of the outlet passageway. Unfortunately, it is somewhat difficult to adjust the flow rate of fluid material at various locations along the width of the outlet of coat hanger dies. As an example, if the outlet passageway has a relatively constant cross-sectional area along the width of the outlet, the flow rate of fluid material in central portions of the outlet tends to be greater than the flow rate of fluid near either side of the outlet. The outlet flow characteristics may be changed by machining or adding shims to interior wall sections of the die surrounding the manifold chamber or the outlet passageway, but such practice is somewhat tedious and requires disassembly and reassembly of the die. Dies having a series of discharge nozzles may be provided with a flow-controlling valve for each nozzle, but such construction represents an additional expense and increases the difficulty of cleaning the die when necessary.

A recent advance in the art of extrusion and coating dies is described in U.S. Pat. No. 5,516,273 and includes an elongated insert that is removably received in a chamber of the die. The insert has a flow-controlling peripheral surface that controls to some extent the characteristics of fluid flow through the outlet passageway. The insert is also round in sections perpendicular to its longitudinal axis so that it may be inexpensively made by a lathe. Preferably, the insert is slidably received in the chamber through an opening of the die housing so that the die does not need to be disassembled in order to remove and replace the insert with another.

The die insert that is described in U.S. Pat. No. 5,516,273 is an advantage because a number of such inserts of varying configurations may be retained on hand and selected for use as needed to vary the flow characteristics of the die outlet. For example, one insert may include a flow-controlling peripheral surface having an enlarged central region and two conical regions that become smaller as either end of the insert is approached, so that the flow rate of fluid material exiting the outlet passageway is substantially uniform across its entire width. Another insert may have a flow-controlling peripheral surface that is cylindrical across the width of the chamber in order to provide a greater flow rate of fluid discharged through central portions of the die outlet in comparison to the flow rate of fluid discharged along either side of the die outlet.

While the die described in U.S. Pat. No. 5,516,273 is advantageous in many respects, there is a continuing need in the art to improve extrusion and coating dies for use in various applications as may be required.

SUMMARY OF THE INVENTION

The present invention is directed in one aspect toward a die for extruding multiple streams. The die comprises a housing having a first outlet passageway, a second outlet passageway and inner wall sections defining a chamber. The die also comprises an insert received in the chamber. The insert has a central axis, a first body portion and a second body portion next to the first body portion in directions along the central axis. The first body portion and the second body portion each include a flow-controlling peripheral surface that extends in an arc about the central axis. One of the housing and the insert includes a first inlet passageway, and one of the housing and the insert includes a second inlet passageway. One of the housing and the insert includes at least one rib in sealing engagement with the other of the housing and the insert. The rib is located between the first body portion and the second body portion and separates the chamber into a first part surrounding the first body portion and the second part surrounding the second body portion. The first part communicates the first inlet passageway with the first outlet passageway. The second part communicates the second inlet passageway with the second outlet passageway. The first part is in non-communication with the second part.

The present invention is also directed toward a die for extruding one or more fluid streams. The die comprises a housing having a first inlet passageway, a first outlet passageway and inner wall sections defining a chamber. The die also comprises an insert that is received in the chamber. The insert has a body portion with a central axis and a flow-controlling peripheral surface that extends in an arc about the central axis. The insert is movable in the chamber in an arc about the central axis between a first position and a second position. The insert communicates the first inlet passageway with the first outlet passageway when the insert is in the first position. The insert substantially blocks the flow of fluid from the first inlet passageway to the first outlet passageway when the insert is in the second position.

These and other features of the invention are described in more detail in the following paragraphs and in the accompanying drawings.

BRIEF DESCRIPTION OF THE DRAWINGS

FIG. 7 is a view somewhat similar to FIG. 1 but showing yet another embodiment of the invention; and FIG. 8 is a front cross-sectional view of a portion of the die shown in FIG. 7 when fully assembled.

DETAILED DESCRIPTION OF THE PREFERRED EMBODIMENTS

Figure 1:
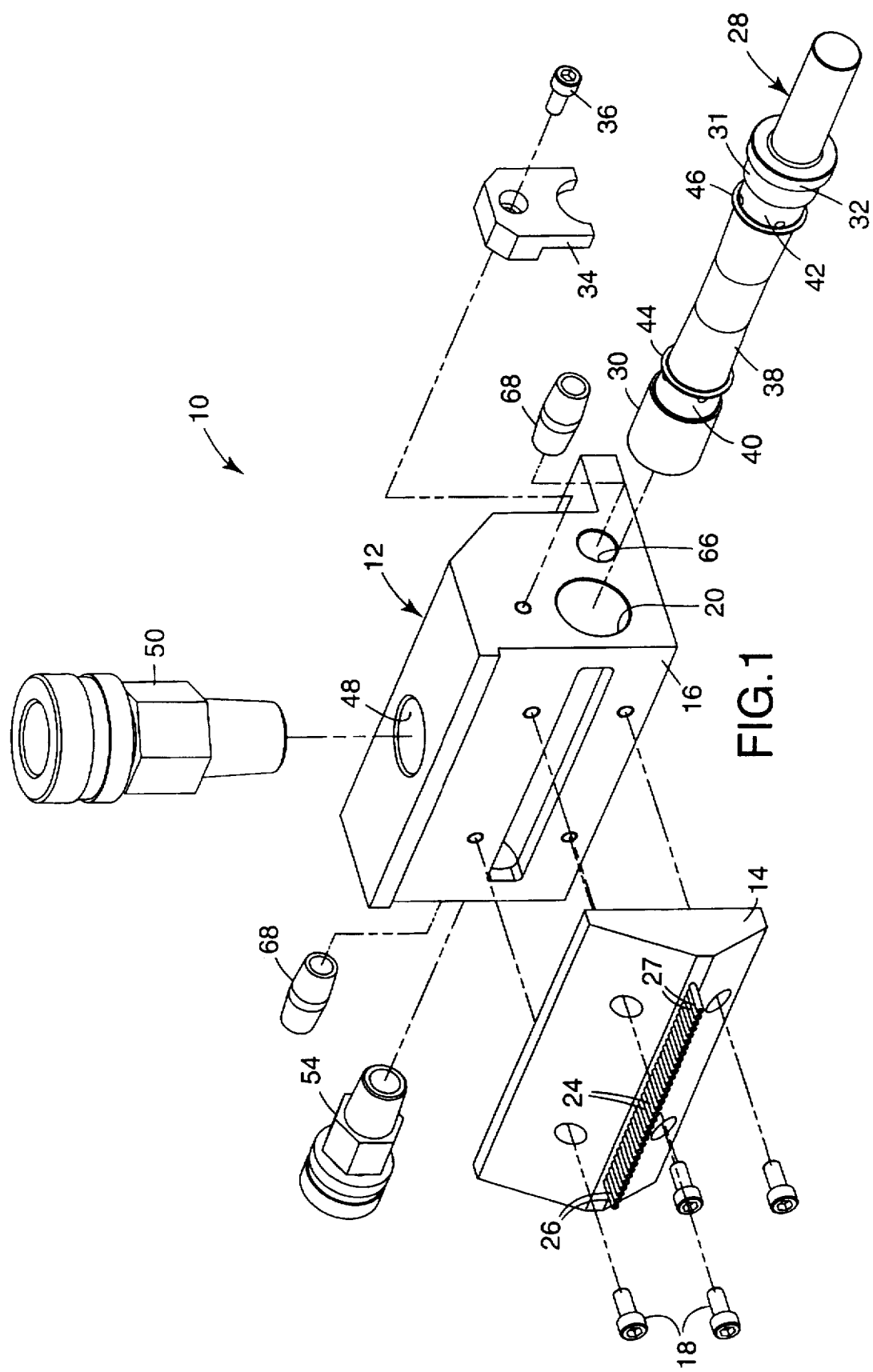
FIG. 1 is a front, top and right side perspective view in exploded form of an extrusion or coating die in accordance with one embodiment of the present invention.

A die 10 for extruding multiple fluid streams is illustrated in FIGS. 1-5 according to one embodiment of the invention and is useful for extrusion or coating applications. The die 10 includes a metallic housing 12 having a front section 14 and a rear section 16. Four machine screws 18 (FIG. 1) extend through holes in the front section 14 and are threaded into threaded bores of the rear section 16 in order to releasably fix the sections 14, 16 together.

Figure 4:
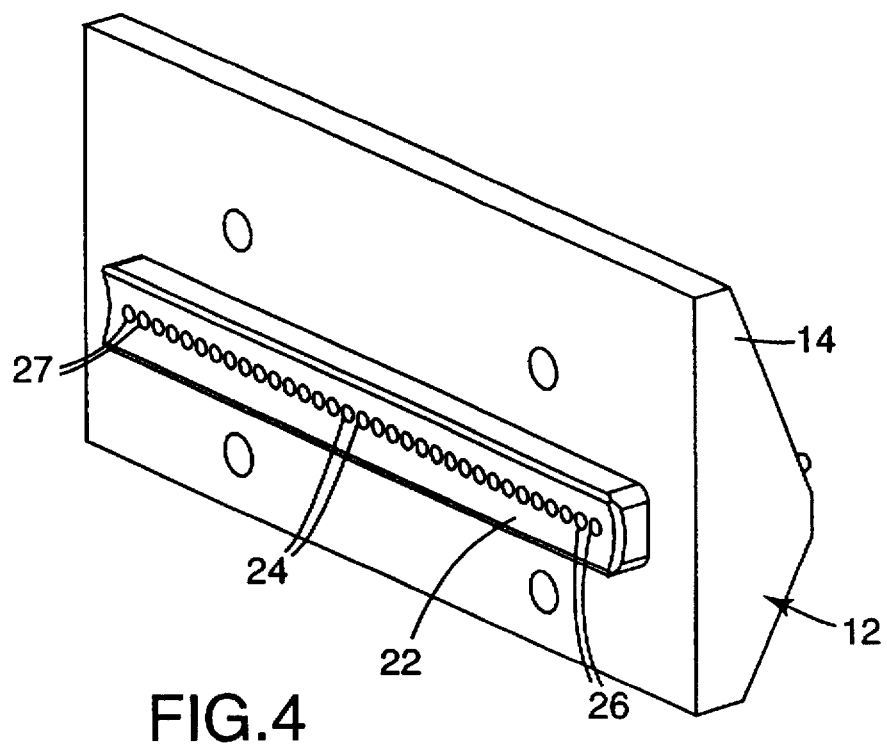
FIG. 4 is an enlarged rear, top and left side perspective view of a front housing section of the die depicted in FIGS. 1-3.

The housing 12 includes inner wall sections that define a generally cylindrical chamber 20. Some of such inner wall sections are located in the rear housing section 16. As shown in FIG. 4, the front housing section 14 includes a protruding member 22 that fits through a front slot (FIG. 1) of the rear housing section 16 when the sections 14, 16 are assembled together. A rearwardly-facing wall section of the member 22 has radius of curvature that matches the radius of curvature of the inner wall sections of the rear section 16, and together such wall sections define the chamber 20.

The housing 12 includes a first outlet passageway that comprises a first series of spaced apart tubes or nozzles 24 located near the center of the front housing section 14. The housing 12 also includes a second outlet passageway that comprises a second series of spaced apart tubes or nozzles 26 and a third outlet passageway that comprises a third series of spaced apart tubes or nozzles 27. The nozzles 26, 27 are located on respective, opposite sides of the series of nozzles 24.

Figure 2:
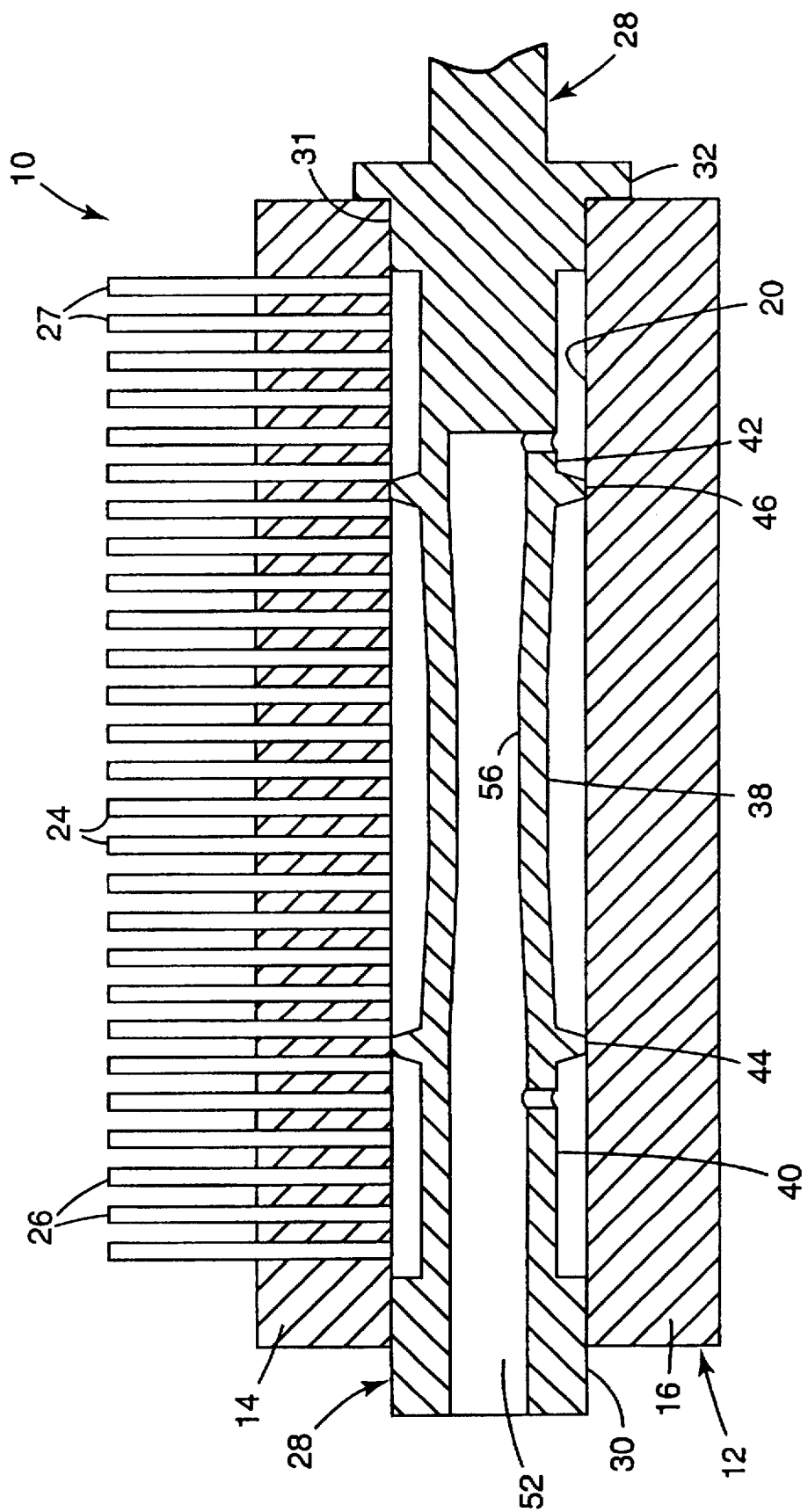
FIG. 2 is an enlarged bottom cross-sectional view (not entirely to scale) of a portion of the die shown in FIG. 1 when fully assembled.

As can be appreciated by reference to FIGS. 1, 2 and 4, the nozzles 24, 26, 27 extend through the front housing section 14 including the member 22 and communicate with the chamber 20. Although not shown in the drawings, each of the nozzles 24, 26, 27 may optionally be provided with a valve to assist in controlling the flow rate of discharged fluid.

Figure 3:
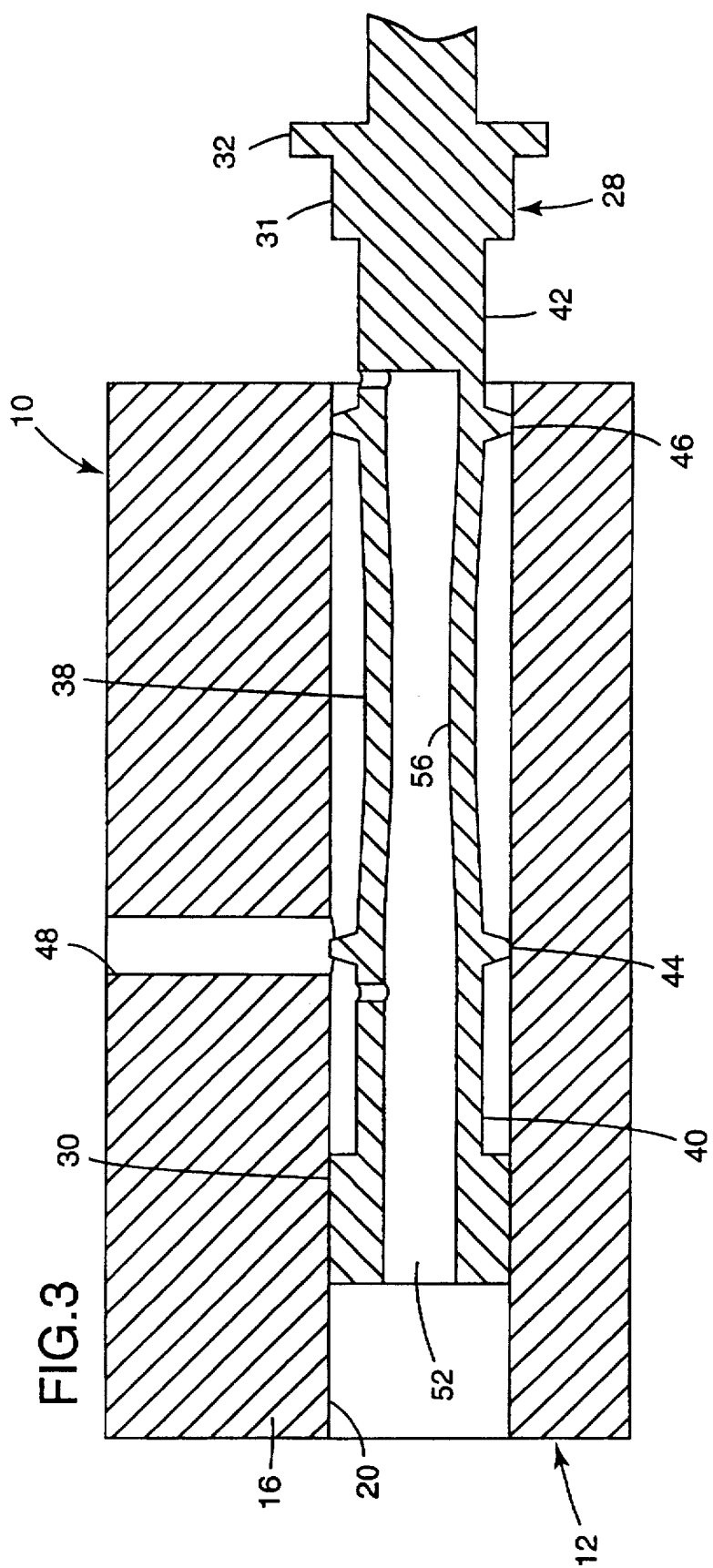
FIG. 3 is an enlarged front cross-sectional view (not entirely to scale) of a portion of the die illustrated in FIGS. 1 and 2, wherein an insert of the die is shown as partially removed.

The die 10 also includes a metallic insert 28 that is received in the chamber 20. Preferably, the insert 28 includes end portions 30, 31 having a cylindrical configuration with an outer diameter that matches the inner diameter of the chamber 20. The insert 28 is preferably removable from the chamber 20 by sliding the insert 28 in a direction along its longitudinal, central axis. The insert 28 is shown as fully received in the chamber 20 in FIG. 2, and is shown in FIG. 3 as partially removed from the chamber 20.

The end portion 31 is connected to an end cap 32 having a cross-sectional area that is somewhat larger than the transverse cross-sectional area of the chamber 20. As illustrated in FIG. 1, a clamp 34 is connected by a machine screw 36 to the right side of the rear housing section 16 in order to releasably secure the insert 28 to the rear housing section 16 in such a manner that the end cap 32 snugly engages the right side of the rear housing section 16. Optionally, each of the end portions 30, 31 can be provided with a circumscribing groove that receives an O-ring in order to prevent leakage of fluid from the chamber 20.

The insert 28 includes a first body portion 38, a second body portion 40 and a third body portion 42, all of which have a flow-controlling peripheral surface that extends in a 360 degree arc about the central, longitudinal axis of the insert 28. The body portions 40, 42 are generally cylindrical. The body portion 38 has a cylindrical middle section and two frustoconical side sections that gradually increase in diameter as the portions 40, 42 are approached. The body portions 38, 40, 42 are all located between the end portions 30, 31.

The insert 28 also includes a first rib 44 that is located between the first and second body portions 38, 40 and a second rib 46 that is located between the first and third body portions 38, 42. The ribs 44, 46 include an outer peripheral edge portion having a radius of curvature that matches the radius of curvature of the end portions 30, 31 when considered in reference planes perpendicular to the central axis of the insert 28. The ribs 44, 46 complementally engage the inner wall sections of the housing 12 that define the chamber 20, and advantageously assist in providing support for middle regions of the insert 28 including the first body portion 38.

The housing 12 includes a first inlet passageway 48 that extends from a top surface of the rear section 16 and into the chamber 20 as can be appreciated by reference to FIGS. 1 and 3. A fitting 50 (shown only in FIG. 1) is threaded into the first inlet passageway 48 and is connected to a source of a first fluid material such as a liquid or semi-liquid material. The first inlet passageway 48 terminates in the center of the chamber 20 directly above the middle of the first body portion 38.

The die 10 also includes a second inlet passageway 52 (see FIGS. 2-3) that, in the embodiment shown, extends through an interior channel of the insert 28. The second inlet passageway 52 extends from the end portion 30 to a series of four holes that extend through the second body portion 40. A fitting 54 (FIG. 1) connects the second inlet passageway 52 to a source of a second fluid material (such as a liquid or semi-liquid material) that is preferably different than the first fluid material.

The insert 28 also includes a third inlet passageway 56 that joins the second inlet passageway 52 near the end portion 30. The third inlet passageway 56 extends along the central axis of the insert 28 and terminates at a series of four holes that pass through the third body portion 42.

The ribs 44, 46 separate the chamber 20 into three distinct and isolated parts. In particular, the ribs 44, 46 separate the chamber 20 into a first part that is located between the ribs 44, 46 and that surrounds the first body portion 38. The first rib 44 and the end portion 30 separate the chamber 20 into a second part that surrounds the second body portion 40. In addition, the second rib 46 and the end portion 31 separate the chamber 20 into a third part that surrounds the third body portion 42.

The ribs 44, 46, are in snug, sealing engagement with inner wall sections of the housing 12 that define the chamber 20 (including the curved wall section of the member 22). The ribs 44, 46 ensure that the first part of the chamber 20 is in non-communication with the second part and the third part of the chamber 20. As a consequence, only the fluid material that enters the die 10 through the first inlet passageway 48 is discharged through the first outlet passageway or nozzles 24. As is shown in FIG. 2, the entrance to each nozzle 24 is located between the first rib 44 and the second rib 46 and communicates with only the first part of the chamber 20.

Similarly, the ribs 44, 46 ensure that only the fluid material that enters the second inlet passageway 52 and the third inlet passageway 56 is discharged through the second series of nozzles 26 and the third series of nozzles 27 respectively. With reference again to FIG. 2, the entrance to each nozzle 26 is located between the first rib 44 and the end portion 30, and the entrance to each nozzle 27 is located between the second rib 46 and the end portion 31. The nozzles 26, 27 communicate only with the second and third parts of the chamber 20.

Optionally, the ribs 44, 46 have a tapered configuration that narrows in cross-sectional area (when considered in reference planes parallel to the central, longitudinal axis of the insert 28) as the wall sections defining the chamber 20 are approached. As a result, the nozzles 24, 26, 27 can be spaced relatively closely together and yet the outer peripheral edge of the ribs 44, 46 can engage selected wall sections between adjacent nozzles, so that one or more of the nozzles 24, 26, 27 are not inadvertently blocked by the ribs 44, 46.

Figure 5:
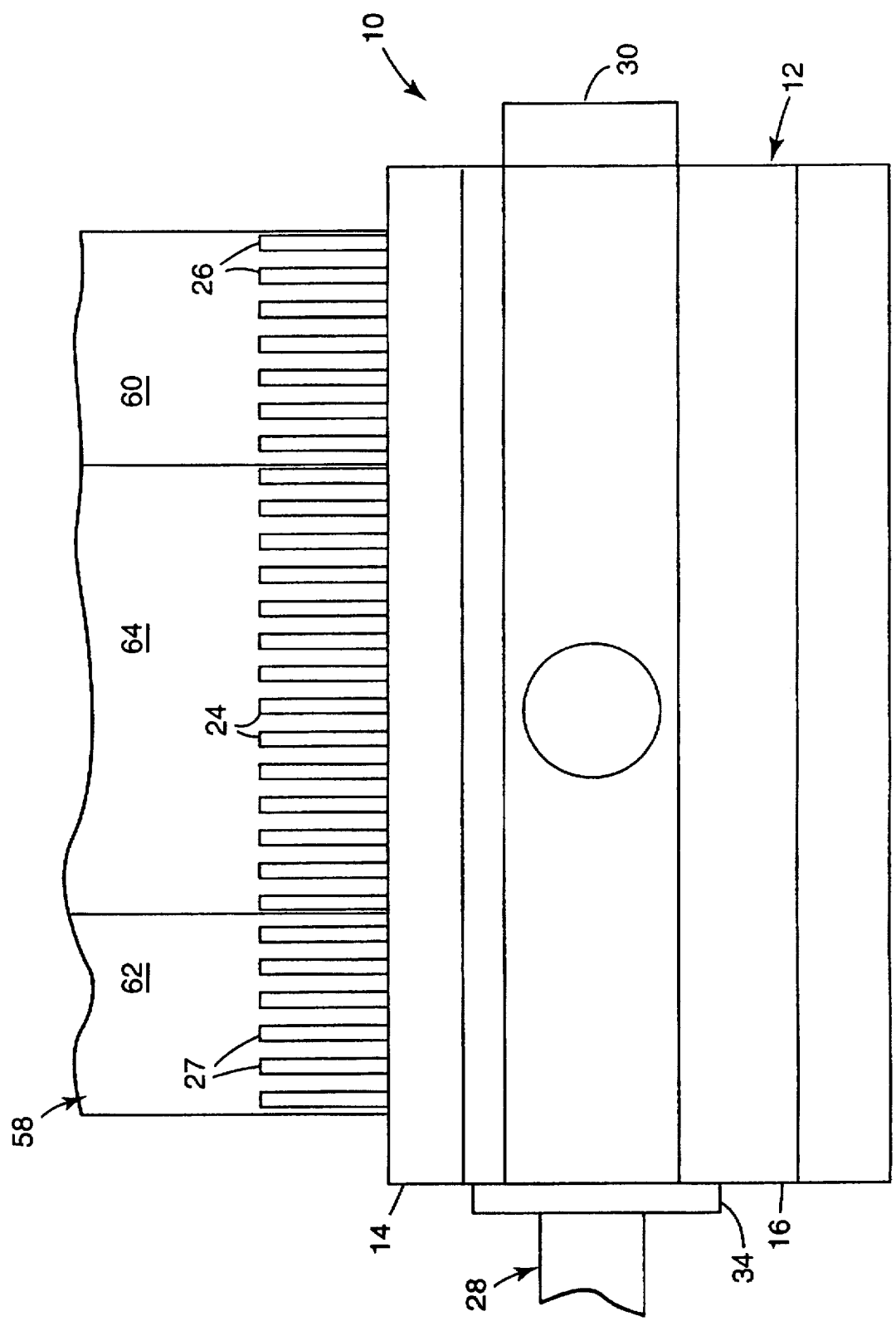
FIG. 5 is a top view (not entirely to scale) of a portion of the die that is shown in FIGS. 1-4 when used in connection with coating two different fluid materials onto a moving web.

An example of use of the die 10 is shown in FIG. 5, wherein fluid material is applied to a moving web 58. The web includes a first edge region 60, a second edge region 62 and a center region 64 that is located between the edge regions 60, 62.

The first fluid material enters the die 10 through the first inlet passageway 48 as previously explained, and is discharged through the first outlet passageway that comprises the series of nozzles 24. Consequently, and as shown in FIG. 5, the first fluid material is applied to the center region 64 of the web 58. The second fluid material enters the second inlet passageway 52 as well as the third inlet passageway 56 and is discharged through the second and third series of nozzles 26, 27. As shown in FIG. 5, the second fluid material is thereby applied to the first and second edge regions 60, 62 of the web 58.

Preferably, the die 10 includes one or more internal channels 66 (see FIG. 1; omitted in FIG. 2) for circulation of a temperature controlling fluid such as a heating fluid. The channel 66 is connected at opposite ends by threaded fittings 68 to a source of temperature controlled fluid, such as a recirculating liquid that is warmed by electric resistance heaters (not shown) or the like. The recirculating liquid elevates the temperature of the housing 12 above ambient for enhancing the flow of the first and second fluid moving through the die 10.

Figure 6:
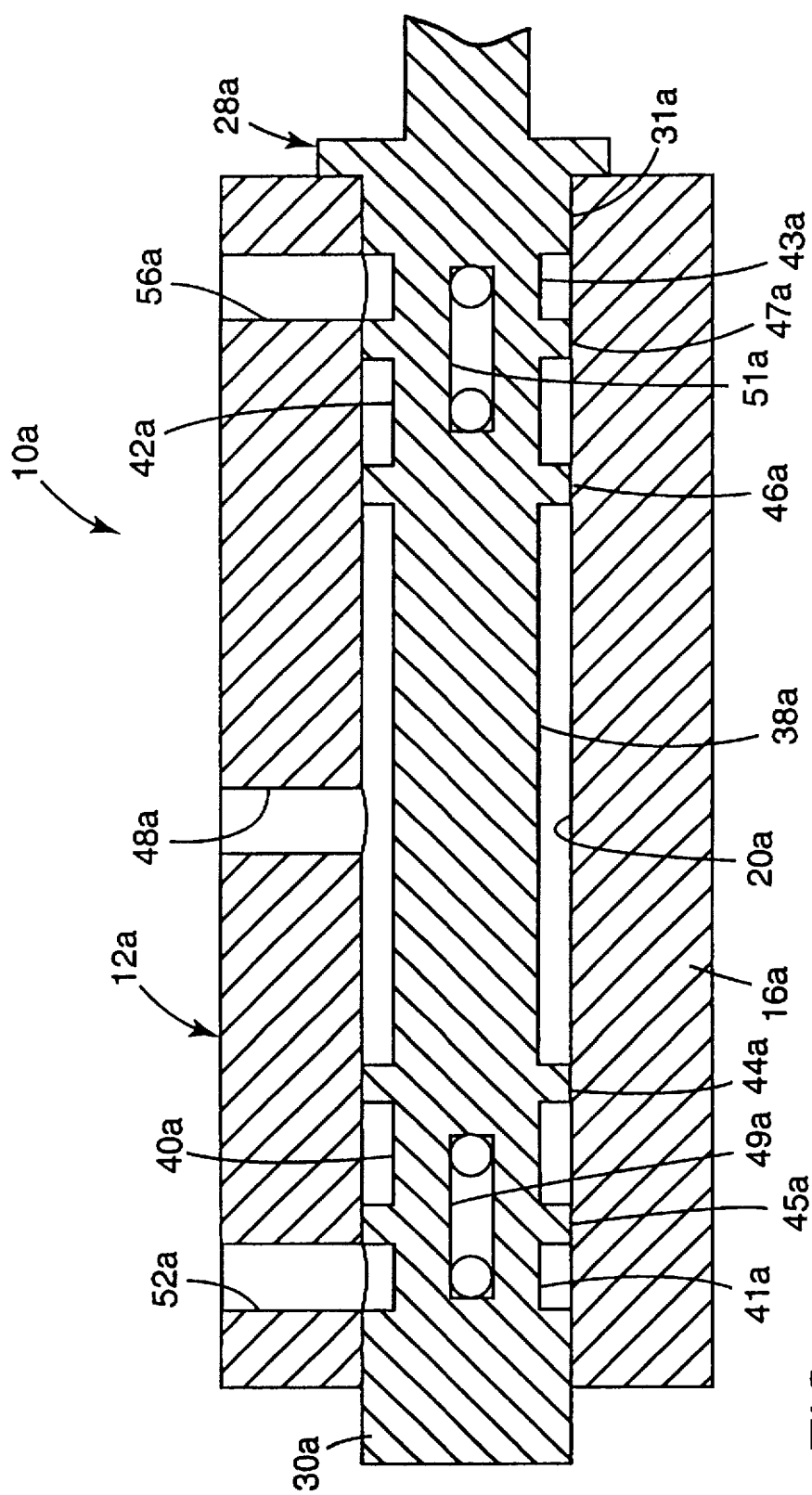
FIG. 6 is a view somewhat similar to FIG. 2 except in accordance with another embodiment of the invention.

Another embodiment of the invention is depicted in FIG. 6, wherein a die 10a includes a housing 12a having a front section (not shown) and a rear section 16a that is detachably connected to the front section. An insert 28a is releasably received in a chamber 20a of the housing 12a. Except as indicated below, the housing 12a and the insert 28a are identical to the housing 12 and the insert 28 respectively that are described above.

The rear housing section 16a a has a first inlet passageway 48a, a second inlet passageway 52a and a third inlet passageway 56a. All of the inlet passageways 48a, 52a, 56a extend from a top surface of the rear housing section 16a to the chamber 20a along spaced apart but parallel paths. The second inlet passageway 52a terminates directly above a peripheral, circumscribing first groove 41a of the insert 28a, and the third inlet passageway 56a terminates directly above a peripheral, circumscribing second groove 43a of the insert 28a. The first inlet passageway 48a terminates directly above the center of a first body portion 38a of the insert 28a.

The insert 28a includes a first rib 44a and a second rib 46a that are somewhat similar to the ribs 44, 46 described above. In addition, the insert 28a includes a third rib 45a that is located between the first rib 44a and an end portion 30a of the insert 28a. Also, a fourth rib 47a is located between the second rib 46a and an end portion 31a. All of the ribs 44a–47a are in snug, sealing engagement with inner wall sections of the housing 12a that define the chamber 20a. The ribs 44a–47a are illustrated as having a rectangular cross-section, but alternatively could have a tapered configuration similar to the configuration of the ribs 44, 46.

The insert 28a includes a second body portion 40a that is located between the ribs 44a, 45a. In addition, a third body portion 42a is located between the ribs 46a, 47a. The body portions 38a, 40a, 42a have a cylindrical exterior flow-controlling peripheral surface, although other shapes are also possible. The ribs 44a, 46a separate the chamber 20a into three distinct parts: a first part that is located between the ribs 44a, 46a and surrounds the first body portion 38a, a second part located between the ribs 44a, 45a and surrounding the second body portion 40a and a third part located between the ribs 46a, 47a and surrounding the third body portion 42a.

The insert 28a also has a pair of internal channels 49a, 51a. The channel 49a extends between the second body portion 40a and the first groove 41a and communicates the second part of the chamber 20a with the second inlet passageway 52a. The channel 51a extends between the third body portion 42a and the second groove 43a and communicates the third part of the chamber 20a with the third inlet passageway 56a. Two openings for each channel 49a, 51a are depicted in FIG. 6 although additional openings are also preferably provided around the circumference of the body portions 40a, 42a and the grooves 41a, 43a. Optionally, the insert 28a is hollow such that the channels 49a, 51a are in communication with each other.

Although not shown in FIG. 6, a first outlet passageway includes a spaced apart series of tubes or nozzles each having an entrance that is located between the ribs 44a, 46a and communicates only with the first part of the chamber 20a. A second outlet passageway includes a spaced apart series of tubes or nozzles each having an entrance that is located between the ribs 44a, 45a and communicates only with the second part of the chamber 20a. A third outlet passageway includes a spaced apart series of tubes or nozzles each having an entrance that is located between the ribs 46a, 47a and communicates only with the third part of the chamber 20a. All of the tubes or nozzles extend through the front section of the housing 12a.

The die 10a is an advantage in some circumstances, especially in instances where space is lacking near the end portion 30a for connecting an internal passageway that extends through the insert 28b to a source of fluid material. However, the housing 12a is somewhat larger in length than the housing 12 mentioned above.

A third embodiment of the invention is illustrated in FIGS. 7 and 8, wherein a die 10b includes a housing 12b with a front section 14b and a rear section 16b. The die 10b also includes an insert 28b that is releasably received in a chamber 20b of the housing 12b. Except as otherwise described below, the housing 12b and the insert 28b are identical to the housing 12 and the insert 28 respectively described above.

The insert 28b has first and second ribs 44b, 46b that are optionally, but not necessarily, somewhat wider than the ribs 44, 46 mentioned above. Moreover, the insert 28b has three valve sections 29b that are located between the rib 44b and an end portion 30b, between the ribs 44b, 46b and between the rib 46b and an end portion 31b respectively. The valve sections 29b have a configuration resembling a partial cylinder with an outer diameter that is identical to the diameter of the end portions 30b, 31b.

A first body portion 38b is located between the ribs 44b, 46b and has a flow-controlling peripheral surface. A second body portion 40b is located between the rib 44b and the end portion 30b, and a third body portion 42b is located between the rib 46b and the end portion 31b. The body portions 38b, 40b, 42b each have a flow-controlling peripheral surface, but in this embodiment the peripheral surfaces do not extend about the entire circumference of the insert 28b in the manner as described in the embodiments shown in FIGS. 1–6. The first body portion 38b, however, includes a slot 39b with a configuration that facilitates uniform flow rate of fluid material through each of a series of nozzles 24b that together comprise a first outlet passageway. As shown in FIG. 7, the front housing section 14b also includes a second outlet passageway or series of nozzles 26b and a third outlet passageway or series of nozzles 27b.

The rear housing section 16b includes a first inlet passageway 48b, a second inlet passageway 52b and a third inlet passageway 56b. The inlet passageways 48b, 52b, 56b extend from a top surface of the rear housing section 16b in parallel relation and terminate at the chamber 20b. Each of the inlet passageways 48b, 52b, 56b is optionally threaded in order to releasably connect to a fitting (not shown), and the fittings are in turn connected to a first, a second and a third source of fluid materials. Optionally, the second inlet passageway 52b and the third inlet passageway 56b may be connected together in order to receive fluid material from a common source.

The insert 28b is rotatable in the chamber 20b in an arc about its central longitudinal axis between a first position and a second position. The arc is shown by the arrow in FIG. 7. Although not illustrated in the drawings, the die 10b preferably has stops to limit rotational movement of the insert 28b, such that one end of its limit of rotational movement represents the first position and the other end of its limit of rotational movement represents the second position. A projecting shaft of the insert 28b has a pair of flat areas for non-rotatable connection to a handle.

When the insert 28b is in the first position, the first body portion 38b communicates the first inlet passageway 48b with the first series of nozzles 24b. Similarly, when the insert 28b is in the first position the second body portion 40b and the third body portion 42b communicate the second inlet passageway 52b and the third inlet passageway 56b with the second series of nozzles 26b and the third series of nozzles 27b respectively.

However, when the insert 28b is in its second position, the valve sections 29b of the insert 28b block the flow of fluid from the first, second and third inlet passageways 48b, 52b, 56b to the first, second and third series of nozzles 24b, 26b, 27b respectively. As such, the flow of fluid material through the outlet passageways 24b, 26b, 27b is interrupted.

When the insert 28b is in its second position, however, the first body portion 38b communicates the first inlet passageway 48b with a first return passageway. Likewise, when the insert 28b is in its second position, the body portions 40b, 42b communicate the second and third inlet passageways 52b, 56b with a second and a third return passageway respectively. The return passageways are not illustrated, but extend rearwardly through the rear housing section 16b in a parallel manner, similar to the arrangement of the inlet passageways 48b, 52b and 56b that are depicted in FIGS. 7 and 8. The inlet passageways 48b, 52b, 56b do not communicate with the first, second and third return passageways respectively when the insert 28b is in its first position.

The valve sections 29b are an advantage, in that movement of the insert 28b from the first position to the second position blocks the flow of fluid through the nozzles 24b, 26b, 27b simultaneously, as might be useful when, for example, coating operations are temporarily suspended. Whenever the flow of fluid through the nozzles 24b, 26b, 27b is interrupted, the return passageways divert the flow of fluid materials, preferably back to their respective sources for re-use. In this manner, the various fluid streams continue to move through the die 10b in order to keep fluid pressures uniform within the chamber and within the various passageways of the die 10b and facilitate stopping and starting of the coating operations as may be desired. Continuous movement of the fluid streams also hinders curing or hardening of the fluid material in the chamber and the various passageways.

The dies 10, 10a, 10b are particularly useful for the manufacture of orthopedic support articles having at least two regions of different hardness. An example of a suitable orthopedic support article is an orthopedic casting tape that comprises a fabric backing and two different curable resins. In one such article, a harder, first curable resin is associated with the center region of the fabric backing (such as the center region 64 shown in FIG. 5) and a second, softer curable resin is associated with outer edge regions of the fabric backing (such as the edge regions 60, 62 shown in FIG. 5). When wrapped around a limb, the softer curable resin associated with the edge regions provide a soft, comfortable edge of the cured cast. For additional details regarding such an orthopedic casting article, as well as other examples, the reader is referred to pending U.S. patent application Ser. No. 08/672,012 entitled "Orthopedic Casting Article Having Soft and Hard Regions" filed on even date herewith, the disclosure of which is expressly incorporated by reference herein.

Those skilled in the art will recognize that a number of modifications and additions to the presently preferred embodiments set out in detail above may be accomplished without departing from the spirit of the invention. For example, the outlet passageways may consist of one or more slots instead of separate, spaced apart nozzles so that a fluid stream in the form of one or more ribbons are delivered. As another example, the partitioning ribs such as ribs 44, 46 etc. may be integral with walls of the die housing instead of with the insert. Other variations are, of course, possible. Accordingly, the scope of the invention should not be limited to the embodiments described above, but only by a fair scope of the claims that follow along with their equivalents.

We claim:

1. A die for extruding multiple fluid streams comprising:

a housing having a first outlet passageway, a second outlet passageway and inner wall sections defining a chamber; and an insert received in said chamber, said insert having a central axis, a first body portion, and a second body portion next to said first body portion in directions along said central axis, said first body portion and said second body portion each including a flow-controlling peripheral surface extending in an arc about said central axis for controlling the flow of respective fluid streams passing through said chamber, each peripheral surface remaining stationary during passage of fluid streams through said chamber, said housing including a first inlet passageway, said insert including a second inlet passageway extending to the second body portion peripheral surface said insert including a second inlet passageway, one of said housing and said insert including at least one rib in sealing engagement with the other of said housing and said insert, said rib being located between said first body portion and said second body portion and separating said chamber into a first part surrounding said first body portion and a second part surrounding said second body portion, said first part communicating said first inlet passageway with said first outlet passageway, said second part communicating said second inlet passageway with said second outlet passageway, said first part being in non-communication with said second part.

2. The die of claim 1, wherein said insert includes and is integral with said rib.

3. The die of claim 2, wherein said rib has a tapered configuration that narrows in width as said inner wall sections are approached.

4. The die of claim 1, wherein said second inlet passageway extends through said insert in directions along the length of said central axis.

5. The die of claim 1 and including a third inlet passageway and a third outlet passageway, wherein said insert includes a third body portion with a flow-controlling peripheral surface extending in an arc about said central axis, and wherein said die includes a second one of said at least one rib defining a third part of said chamber, surrounding said third body portion, that communicates said third inlet passageway with said third outlet passageway.

6. The die of claim 6, wherein said second inlet passageway is in communication with said third inlet passageway which extends to the third body portion peripheral surface.

7. The die of claim 1, wherein said insert is removably received in said chamber.

8. The die of claim 7, wherein said insert is slidably received in said chamber.

9. The die of claim 1, wherein said insert includes an end portion, and wherein said second inlet passageway extends through said end portion and through said insert in directions along said central axis.

10. The die of claim 1, wherein said insert includes at least one end portion with a cylindrical surface, and wherein said inner wall sections of said housing include a cylindrical end wall section that is complemental to and engages said cylindrical surface of said end portion.

* * * * *

UNITED STATES PATENT AND TRADEMARK OFFICE
CERTIFICATE OF CORRECTION

PATENT NO.: 5,750,159

DATED: May 12, 1998

INVENTOR(S): Delmore, Michael D. et al.

It is certified that error appears in the above-identified patent and that said Letters Patent is hereby corrected as shown below:

Col. 9, Line 19-20, delete "said insert including a second inlet passageway".

Signed and Sealed this

Twenty-third Day of February, 1999

Attest:

Q. TODD DICKINSON

*Attesting Officer*   *Acting Commissioner of Patents and Trademarks*